Nov. 27, 1951  A. G. HUPP  2,576,605
V BELT CLUTCH FOR POWER TRANSMISSION
Filed July 6, 1948  3 Sheets—Sheet 2

INVENTOR.
Arleigh G. Hupp
BY
Andrus & Scales
Attorneys

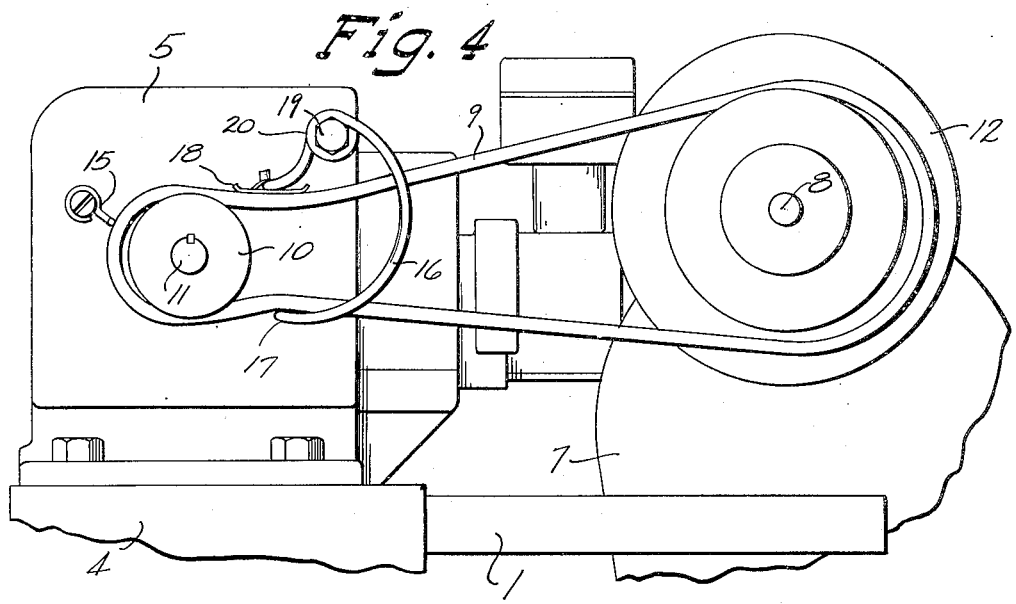
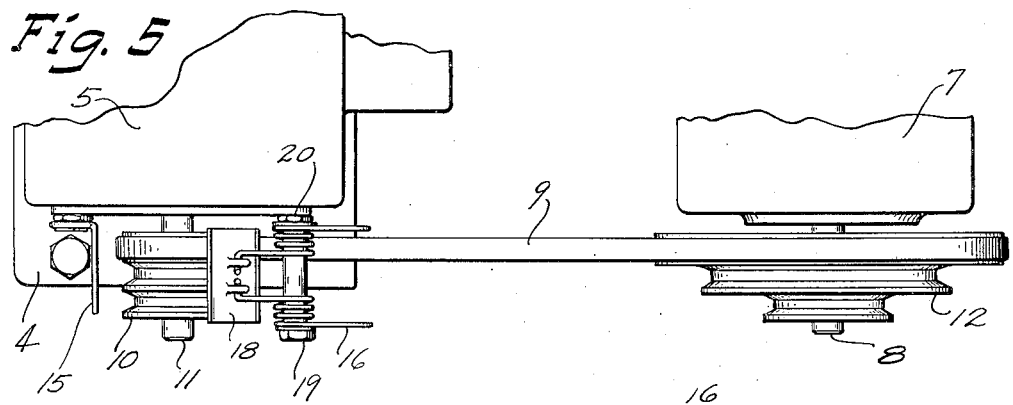
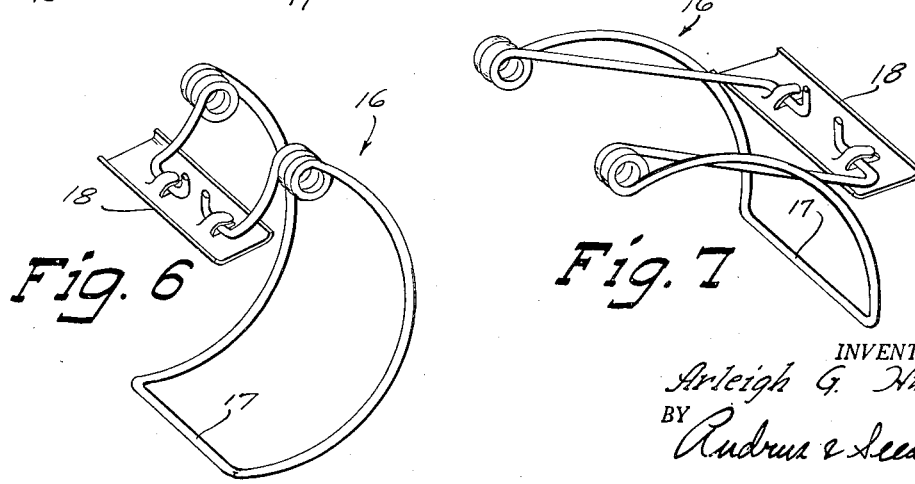
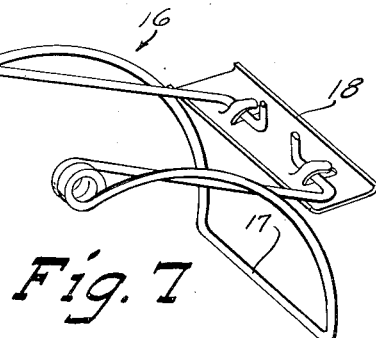

Patented Nov. 27, 1951

2,576,605

UNITED STATES PATENT OFFICE 2,576,605

V-BELT CLUTCH FOR POWER TRANSMISSION

Arleigh G. Hupp, South Milwaukee, Wis., assignor to The Midland Co., South Milwaukee, Wis., a corporation of Wisconsin Application July 6, 1948, Serial No. 37,281

7 Claims. (Cl. 74—242.11)

This invention relates to a V-belt clutch for power transmission, and more particularly to the construction of a control spring for the belt to provide an improved clutching action therefor.

The invention has found particular adaptation to small garden tractors, power lawn mowers and the like where small horse-power internal combustion engines are usually employed.

One of the principal objects of the invention is to provide a smoother clutch action, thereby reducing the tendency of stalling the engine when starting under load.

Another object of the invention is to reduce grabbing of the V-belt in the drive sheave during clutching, thereby greatly reducing the strain on the engine, and transmission gearing.

Another object is to control the position of the belt relative to the drive sheave at all times and thereby effect a gradual power pick-up from the sheave to the belt during clutching and a similar action in reverse order during clutch release.

Another object is to provide a clutch control for a V-belt drive which can be used with multiple width sheaves and different sizes of driven sheaves providing for different driving ratios without adjustment of the control mechanism.

Another object is to provide a clutch control that can be used with multiple V-belt drives.

Another object is to provide a V-belt clutch control spring which automatically maintains its correct operating position at all times.

Another object is to provide a V-belt clutch control spring which does not interfere with the assembling of the belt upon the sheaves or with the removal of the belt or its adjustment to different speed sheaves.

An embodiment of the invention is illustrated in the accompanying drawings in which:

Fig. 4 is a view similar to Fig. 2 showing the belt adjusted upon a different size driven sheave;

Fig. 5 is a top plan view of the drive of Fig. 2;

Fig. 6 is an enlarged perspective view of the clutch spring for one type of engine; and Fig. 7 is a similar view of a clutch spring for another type of engine.

Figure 1:
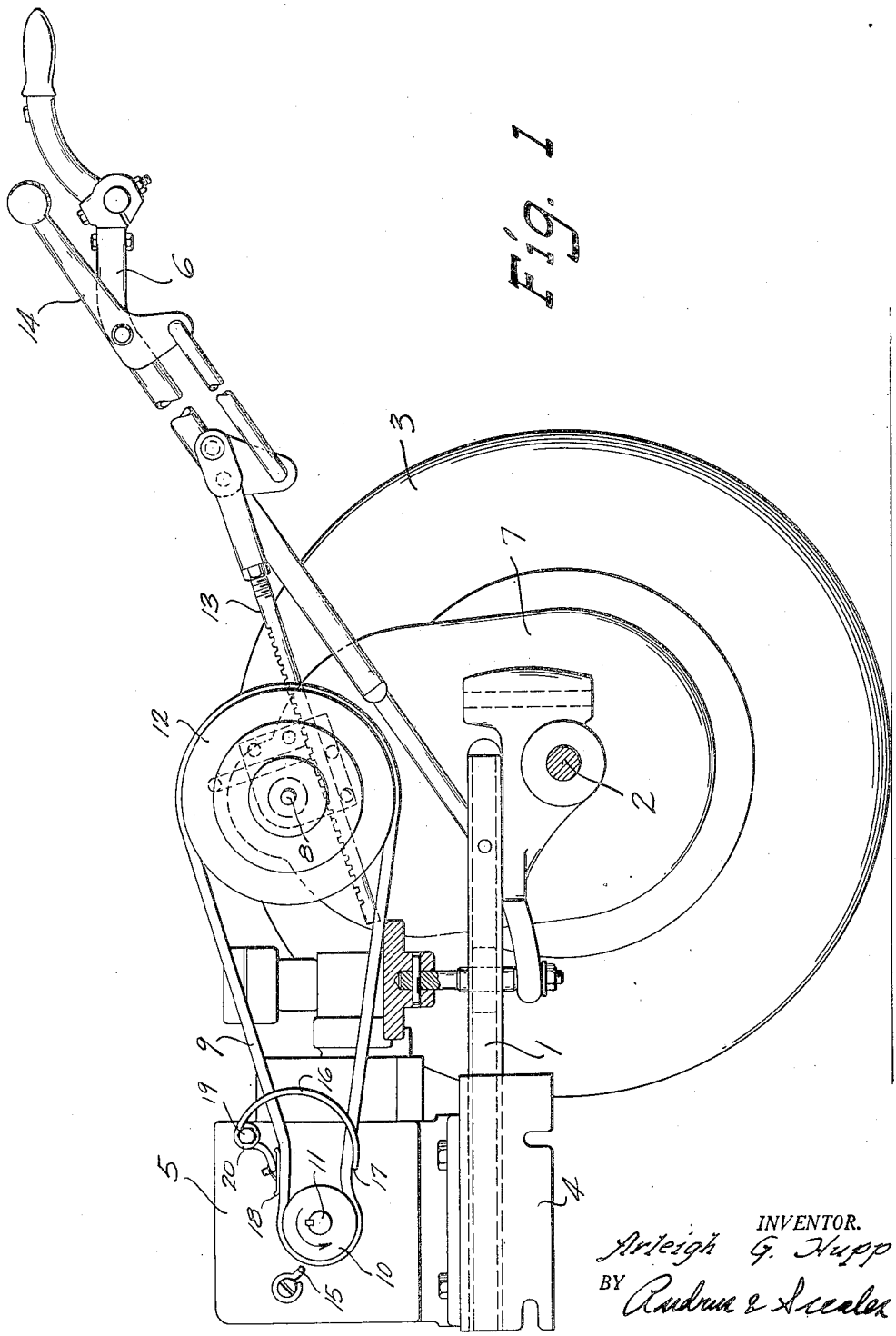
Figure 1 is a side elevation of a small two-wheel garden tractor showing the clutch drive.
Figure 2:
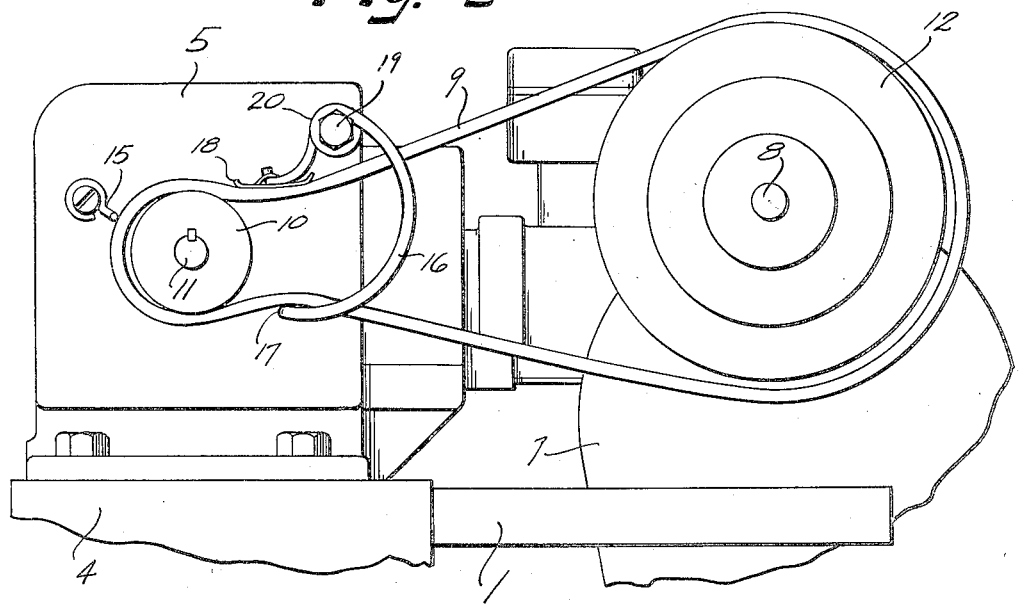
Fig. 2 is an enlarged side elevation of the clutch drive showing the clutch released.
Figure 3:
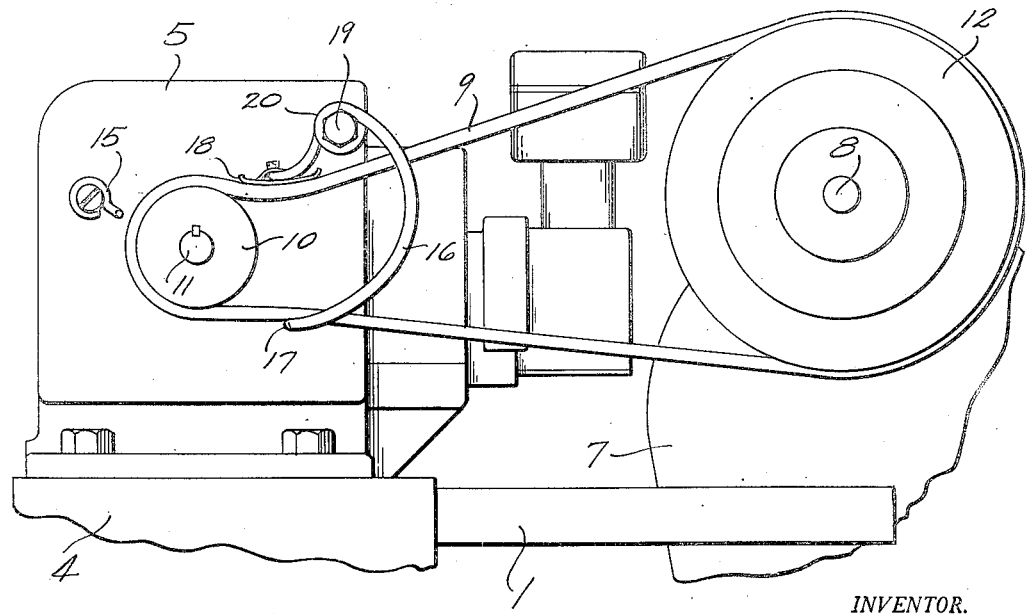
Fig. 3 is a similar view showing the clutch in closed position.

The invention is illustrated as applied to a drive for a small garden tractor which frequently has to be started under full load with an engine of relatively small capacity. The tractor illustrated is more particularly described in a copending application Serial No. 112,252 filed by the present inventor on or about August 25, 1949.

The tractor comprises, in general, a frame 1 carried by a transverse axle 2 and a pair of drive wheels 3 secured to the opposite ends of the axle.

The frame 1 has a forwardly extending platform 4 for carrying a small engine 5. The frame also has a rearwardly and upwardly extending handle bar 6 which facilitates guiding of the tractor by the operator.

A gear transmission 7 extends upwardly from axle 2 to a horizontal drive shaft 8 extending transversely of the frame 1.

The drive shaft 8 is driven from the engine 5 by means of a V-belt 9, a drive sheave 10 on the engine shaft 11 and a driven sheave 12 on the drive shaft 8.

The sheaves 10 and 12 are preferably of the multiple sheave type, each having a plurality of belt grooves therein, and the several sheave sections of the driven sheave 12 being of different diameter to provide for different power and speed ratios by the shifting of the belt 9 from one section to another.

The transmission 7 is disposed to pivot on the axle 2 relative to frame 1 to move shaft 8 and sheave 12 either toward or away from the engine 5 and drive sheave 10 and thereby tighten or loosen belt 9. The pivotal movement of transmission 7 is effected by a control rod 13 carried by the handle bar 6 and operated by a lever 14 at the upper end of the handle bar, as completely described in the copending garden tractor application identified above. The effective length of rod 13 is adjustable to compensate for shifting of the belt 9 to different diameter sections of sheave 12.

When belt 9 is loosened by movement of sheave 12 toward sheave 10 by means of lever 14 and control rod 13, the belt rests lightly upon the drive sheave 10 and is pulled forwardly by continued rotation of sheave 10 in a counter-clockwise direction as shown by the arrows in the drawing.

A guide 15 is preferably provided, secured to the engine and extending across sheave 10 in forwardly spaced relation thereto to engage the belt as the same loosens and moves forwardly thereagainst to thereby frictionally retain the belt against longitudinal displacement from the sheave groove in which it is placed.

The operation of a V-belt drive as a clutch usually results in a grabbing of the sheave by the belt as the latter tightens upon the sheave. This effects a very quick start for the drive and is objectionable where the start is under load and the engine is reasonably small and unable to absorb the shock load of the start. Any attempt to tighten the belt slowly is apt to result in a series of successive grabs and releases which either throws the belt or stops the engine entirely.

The present invention is based upon the discovery that a cushioned clutch action can be obtained with a V-belt so that the tractor can be started under substantial load without unduly speeding the engine or causing the difficulties described above.

In carrying out the invention the belt 9 is supported relative to the drive sheave 10 so that the belt does not sag completely away from the sheave at the bottom and the belt is supported at the bottom in such a manner as to prevent initial grabbing of the belt by the sheave at the top. The stiffness of the belt 9 relative to its curvature about the sheave 10, when loose, should be sufficient to support the belt loosely above the sheave when the belt is supported against undue sagging at the bottom of the sheave.

The means employed to support the belt in relation to the sheave may take various forms. It should be correlated to the sheave and the belt and disposed to hold the belt preferably under a slight tension when driving.

For this purpose the present invention employs a freely floating spring 16 which is carried by the engine 5 or any other suitable support and which engages the top of the belt above the sheave 10 and the bottom of the belt below the sheave.

The spring 16 can take various forms, and two different forms are shown in Figs. 6 and 7. Each form of the spring 16 provides two separate belt guide sections 17 and 18 extending transversely of the belt, and which are spaced apart a distance which is correlated to the outside diameter of the belt as it passes around the drive sheave, depending upon the distance the guide sections are disposed from the sheave.

In the spring construction illustrated the lower guide section 17 is made up of the center of the wire forming the spring, and extends horizontally for the full width of the three drive sheave sections so that it will engage and support the underside of the belt regardless with which sheave section the belt is aligned.

The upper guide section 18 consists of a shoe secured to the ends of the wire forming the spring, and extends horizontally for the full width of the three drive sheave sections so that it will rest on top of the belt regardless with which sheave section the belt is aligned.

The guide sections 17 and 18 may be formed of the wire of spring 16, or either of them or both may be constructed of a shoe or roller mounted on the wire, depending upon the frictional characteristics desired.

The guide sections 17 and 18 should be disposed near to the drive sheave 10, and depending upon the stiffness of the belt, the strength of the spring and the spacing of the guide sections, they are preferably disposed a distance from the vertical central plane of the drive sheave equal to and ranging from about one radius for the sheave to about two radii for the sheave. The actual distance may vary over a much wider range under special circumstances but it has been found that the range stated is preferable for most conditions.

The spring 16 between guide sections 17 and 18 is curved to provide a working resilience for varying the spacing of the guide sections and should be under a reasonable stress when the guide sections are moved apart as when the belt is tight and under full operating load. When the belt is loosened the spring returns the guide sections to normal position.

The intermediate spring portions may be coiled around a supporting pivot pin 19 as at 20 to support the spring 16 relative to the sheave.

The pivot pin 19 in the embodiments illustrated is made up of a metal tube through which a bolt extends axially, and the bolt is threaded into the engine block so that the tube is confined tightly between the engine block and the head of the bolt.

The spring 16 is mounted to freely pivot on pin 19 and the pin 19 is disposed horizontally and spaced from the guide sections 17 and 18 sufficiently to provide for vertical floating of the guide sections during functioning of the spring in controlling the belt.

In the embodiment of Fig. 6 the pin 19 is disposed generally to the rear and above upper guide section 18. In the embodiment of Fig. 7 the pin 19 is disposed forwardly of the section 18 and of the sheave 10, substantially in line with the upper flight of belt 9. The exact location for pin 19 will be determined largely by the convenience of attachment to the engine block, within the limits of the requirement for the floating of the guide sections 17 and 18.

Positioning of the guide sections 17 and 18 sufficiently to the rear of drive sheave 10 facilitates threading of the belt between the guide sections in applying the belt to the sheaves and removing the belt from the sheaves. During the applying of the belt the spring 16 automatically assumes its proper position with guide sections 17 and 18 engaging the corresponding belt flights, without requiring separate manual adjustment of the guide sections. Furthermore, the sections 17 and 18 are always retained in working position and never become displaced therefrom so long as the belt 9 is in place on sheaves 10 and 12.

During operation the spring 16 functions to keep the belt loose at the top of the sheave 10 until the belt has tightened upon the sheave to a position where the end of the belt passing around the sheave assumes a curvature which effects a nearly uniform engaging movement of the belt in the groove of the sheave for a substantial part of the circumference of the latter.

As the belt starts to engage with the sheave 10 its gradual pull on the sheave 12 tends to tighten the belt in the groove of sheave 10 at the top, but in so doing the upper guide section 18 is raised tending to raise lower guide section 17 which then tends to loosen the belt at the top of the sheave 10 and to tighten the belt at the bottom, with the result that the belt tends to tighten equally at the top and bottom. This fact provides a true slip clutch effect so that the belt takes hold gradually.

Expressing the action in other words, the spring has the effect of increasing the area of initial engagement between the belt and sheave and to provide more uniform engagement pressure over the area of engagement so that the belt does not tighten in the groove at one location. In this way grabbing is largely prevented and a slip clutch action is attained.

When the belt has accelerated to the speed of the drive sheave the guide sections 17 and 18 are somewhat spread apart thereby exerting a spring tightening tension upon the belt to prevent belt slippage and more effectively transmitting the power of the engine to the wheels of the tractor.

The invention has application to any V-belt drive in which it is desired to employ the belt as a clutch member for starting and stopping the drive. The slip clutch effect obtained by the invention makes it possible to start under heavy load without severe jerking and without racing the engine.

In the illustration, the upper and lower flights of the belt are disposed substantially horizontal. The invention is applicable to belts having flights disposed at any angle where the belt has a tendency to grab the drive sheave during clutching.

The invention may have various embodiments within the scope of the accompanying claims.

I claim:

1. In combination with a V-belt disposed to clutch a drive sheave for power transmission and wherein the belt is loose on the sheave when declutched therefrom, a pair of guides for the belt to control the clutching action of the belt when the belt is tightened upon the sheave, each guide being disposed to engage the outer surface of a flight of the belt adjacent the sheave, and a single support for said guides disposed to provide freedom of floating action therefor under the influence of said belt and to maintain said guides in spaced relation correlated to the spacing of the belt flights in final clutch tightened position to effect a tensioning of the belt.

2. The combination of claim 1 in which the support for the guides is resilient and provides for a variation in the spacing of the guides during the clutching action.

3. A clutch spring for V-belt clutches adapted to control the clutching movement of the belt upon the drive sheave, comprising a resilient body member carrying a pair of spaced belt guide members, disposed to engage the corresponding flights of the belt in opposed relation and extending transversely across the belt, said body member resiliently supporting each guide member at both ends of the guide member and having a central tubular section for pivotally mounting the spring to effect floating action thereof under the influence of the belt.

4. A clutch spring for V-belt clutches adapted to control the clutching movement of the belt upon the drive sheave, comprising a resilient body member carrying a pair of spaced belt guide members, disposed to engage the corresponding flights of the belt in opposed relation and extending transversely across the belt, said body member consisting of a circular section pivotally mounting the same for floating action under the influence of the belt and a separate spring extension from said circular section to each end of each guide member to resiliently support the latter in position.

5. A clutch spring for V-belt clutches adapted to control the clutching movement of the belt upon the drive sheave, comprising a resilient body member carrying a pair of spaced belt guide members, disposed to engage the corresponding flights of the belt in opposed relation and extending transversely across the belt, said body member consisting of a single wire-like strip of resilient spring metal having a coil section extending transversely of the belt and adapted to encircle a pivot pin for supporting the spring and pivotally mounting the same for free floating action, and having resilient arms extending from the coil section to the opposite ends of the guide members for supporting the latter, and the arms for at least one of said guide members being joined by a transverse section of the strip.

6. A clutch spring for V-belt clutches adapted to control the clutching movement of the belt upon the drive sheave, comprising a resilient body member carrying a pair of spaced belt guide members, disposed to engage the corresponding flights of the belt in opposed relation and extending transversely across the belt, said body member consisting of a single wire-like strip of resilient spring metal having a coil section extending transversely of the belt and adapted to encircle a pivot pin for supporting the spring and pivotally mounting the same for free floating action, and having resilient arms extending from the coil section to the opposite ends of the guide members for supporting the latter, the arms for at least one of said guide members being joined by a transverse section of the strip, and at least one of said guide members consisting of a shoe pivotally secured to said strip arm supports therefor and adapted to frictionally engage the belt.

7. A clutch spring for V-belt clutches adapted to control the clutching movement of the belt upon the drive sheave, comprising a resilient body member carrying a pair of spaced belt guide members disposed to engage the corresponding flights of the belt in opposed relation and extending transversely across the belt, said body member resiliently supporting each guide member at both ends of the guide member and having a central tubular section for pivotally mounting the spring to effect floating action thereof under the influence of the belt, the pivotal mounting for said spring being disposed to provide engagement of the belt by said guide members adjacent the drive sheave and within a distance from the central axial plane of the sheave transverse to the belt flights ranging from one to two radius lengths of the sheave.

ARLEIGH G. HUPP.

REFERENCES CITED

The following references are of record in the file of this patent:

UNITED STATES PATENTS

| Number | Name | Date |
| --- | --- | --- |
| 976,115 | Bard | Nov. 15, 1910 |
| 2,186,405 | Carter | Jan. 9, 1940 |

FOREIGN PATENTS

| Number | Country | Date |
| --- | --- | --- |
| 66,985 | Sweden | Mar. 12, 1929 |
| 323,959 | Great Britain | Jan. 16, 1930 |